United States Patent
Leise et al.

(10) Patent No.: US 10,817,953 B1
(45) Date of Patent: Oct. 27, 2020

(54) USING A DISTRIBUTED LEDGER FOR TRACKING VIN RECORDKEEPING

(71) Applicant: STATE FARM MUTUAL AUTOMOBILE INSURANCE COMPANY, Bloomington, IL (US)

(72) Inventors: William J. Leise, Normal, IL (US); Jacob J. Alt, Downs, IL (US); Jaime Skaggs, Chenoa, IL (US); Eric Bellas, Bloomington, IL (US); Shawn M. Call, Bloomington, IL (US); Eric R. Moore, Heyworth, IL (US); Melinda Teresa Magerkurth, Utica, IL (US); Vicki King, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 197 days.

(21) Appl. No.: 15/910,260

(22) Filed: Mar. 2, 2018

Related U.S. Application Data

(60) Provisional application No. 62/557,433, filed on Sep. 12, 2017, provisional application No. 62/557,415, (Continued)

(51) Int. Cl.
   *G06Q 40/08* (2012.01)
   *G06F 16/27* (2019.01)
   *G06Q 40/00* (2012.01)

(52) U.S. Cl.
   CPC ............. *G06Q 40/08* (2013.01); *G06F 16/27* (2019.01); *G06Q 40/00* (2013.01)

(58) Field of Classification Search
   CPC ........ G06Q 40/00; G06Q 40/04; G06Q 40/08; G06F 16/27
   See application file for complete search history.

(56) References Cited

U.S. PATENT DOCUMENTS

| | | | |
|---|---|---|---|
| 5,825,283 A | 10/1998 | Camhi | |
| 5,950,169 A * | 9/1999 | Borghesi | G06Q 40/08 705/400 |

(Continued)

OTHER PUBLICATIONS

Lawrence S. Powell, Kathleen A. McCullough, Patrick F. Maroney and Cassandra R. Cole, Consumer Choice in Auto Repair: The Politics and Economics of Automobile Insurance Repair Practices, Sep. 2010, National Association of Mutual Insurance companies, web, 2-24 (Year: 2010).*

(Continued)

*Primary Examiner* — I Jung Liu
(74) *Attorney, Agent, or Firm* — Marshall, Gerstein & Borun LLP

(57) ABSTRACT

Systems and methods are disclosed for creating, maintaining, and interacting with a distributed ledger for VIN recordkeeping related to a particular vehicle. The systems and methods include the use of smart contracts, and receiving information about the vehicle, such as a description of the vehicle, whether the vehicle is covered by insurance, financial information related to the vehicle, and any maintenance data about the vehicle. This information may be used to create a distributed ledger for the particular vehicle, and during the vehicle's lifetime events related to the vehicle may be recorded in the distributed ledger.

16 Claims, 6 Drawing Sheets

Related U.S. Application Data filed on Sep. 12, 2017, provisional application No. 62/557,403, filed on Sep. 12, 2017, provisional application No. 62/557,393, filed on Sep. 12, 2017, provisional application No. 62/557,359, filed on Sep. 12, 2017, provisional application No. 62/557,446, filed on Sep. 12, 2017, provisional application No. 62/550,131, filed on Aug. 25, 2017, provisional application No. 62/550,224, filed on Aug. 25, 2017, provisional application No. 62/550,245, filed on Aug. 25, 2017, provisional application No. 62/550,140, filed on Aug. 25, 2017, provisional application No. 62/550,172, filed on Aug. 25, 2017, provisional application No. 62/550,186, filed on Aug. 25, 2017, provisional application No. 62/550,261, filed on Aug. 25, 2017, provisional application No. 62/550,197, filed on Aug. 25, 2017, provisional application No. 62/501,621, filed on May 4, 2017, provisional application No. 62/500,977, filed on May 3, 2017, provisional application No. 62/469,070, filed on Mar. 9, 2017, provisional application No. 62/468,092, filed on Mar. 7, 2017, provisional application No. 62/466,917, filed on Mar. 3, 2017.

(56) References Cited

U.S. PATENT DOCUMENTS

| | | |
|---|---|---|
| 6,714,894 B1 | 3/2004 | Tobey et al. |
| 6,898,574 B1 | 5/2005 | Regan |
| 6,928,348 B1 | 8/2005 | Lightner et al. |
| 7,359,821 B1 | 4/2008 | Smith et al. |
| 8,046,281 B1 | 10/2011 | Urrutia |
| 8,311,856 B1 | 11/2012 | Hanson et al. |
| 8,615,473 B2 | 12/2013 | Spiegel et al. |
| 9,000,903 B2 | 4/2015 | Bowers et al. |
| 9,646,345 B1 | 5/2017 | Leise |
| 9,672,719 B1 | 6/2017 | Hollenstain et al. |
| 10,145,684 B1 | 12/2018 | Tofte et al. |
| 10,156,848 B1 | 12/2018 | Konrardy et al. |
| 10,445,302 B2 | 10/2019 | Childress et al. |
| 10,521,780 B1 | 12/2019 | Hopkins et al. |
| 2002/0007289 A1 | 1/2002 | Malin et al. |
| 2002/0165791 A1 | 11/2002 | Segawa et al. |
| 2004/0111301 A1 | 6/2004 | Wahlbin et al. |
| 2005/0065711 A1 | 3/2005 | Dahlgren et al. |
| 2006/0095302 A1* | 5/2006 | Vahidi ............... G06Q 40/00 705/4 |
| 2006/0168185 A1 | 7/2006 | McCall et al. |
| 2006/0287807 A1 | 12/2006 | Teffer |
| 2007/0204078 A1 | 8/2007 | Boccon-Gibod et al. |
| 2008/0103785 A1* | 5/2008 | Logan ............... G06Q 30/06 705/302 |
| 2008/0122603 A1 | 5/2008 | Plante et al. |
| 2008/0147266 A1 | 6/2008 | Plante et al. |
| 2012/0076437 A1 | 3/2012 | King |
| 2013/0339189 A1 | 12/2013 | Minerick |
| 2014/0039935 A1 | 2/2014 | Rivera |
| 2014/0077972 A1 | 3/2014 | Rathi et al. |
| 2015/0154712 A1 | 6/2015 | Cook |
| 2015/0170288 A1 | 6/2015 | Harton et al. |
| 2016/0323741 A1 | 11/2016 | Lee et al. |
| 2017/0017734 A1 | 1/2017 | Groh et al. |
| 2017/0046792 A1 | 2/2017 | Haldenby et al. |
| 2017/0116693 A1 | 4/2017 | Rae et al. |
| 2017/0228371 A1 | 8/2017 | Seger, II |
| 2017/0346637 A1 | 11/2017 | Zhang |
| 2017/0353309 A1 | 12/2017 | Gray |
| 2017/0372431 A1 | 12/2017 | Perl et al. |
| 2018/0018723 A1 | 1/2018 | Nagla et al. |
| 2018/0143995 A1 | 5/2018 | Bailey et al. |
| 2018/0165588 A1 | 6/2018 | Saxena et al. |
| 2018/0227118 A1 | 8/2018 | Bibera et al. |
| 2018/0253464 A1 | 9/2018 | Kohli et al. |
| 2018/0337769 A1 | 11/2018 | Gleichauf |
| 2018/0342036 A1 | 11/2018 | Zachary |

OTHER PUBLICATIONS

Cointelegraph, "HashCoin Uses Emercoin Blockchain for Vehicle Registration and Tracking". Retrieved from the Internet at: <https://cointelegraph.com/news/hashcoin-uses-emercoin-blockchain-for-vehicle-registration-and-tracking> (2018).

"Blockchain in the Insurance Sector", PricewaterhouseCoopers LLP (2016).

Powell et al., Consumer Choice in Auto Repair: The Politics and Economics of Automobile Insurance Repair Practices, National Association of Mutual Insurance companies, 32 pages (Sep. 2010).

Blockchain Technology in the Insurance Sector, Quarterly Meeting of the Federal Advisory Committee on Insurance (FACI), McKinsey & Company, Jan. 5, 2017.

* cited by examiner

VINChain 200

VIN Number (key)

| DATA ELEMENT | Owner info | Title status (clean, salvaged, etc.) | Lienholder info / Lien payoff amt | Policy Start Date / Policy End Date | Claim opendate / Claim close date | Build data (vehicle features) | Maintenance/ Repair data | Telematics, odometer data |
|---|---|---|---|---|---|---|---|---|
| (CREATE/ UPDATE) | Manufacturers Dealerships Body Shops DMVs Insurers Salvage vendors | | Lienholders | Insurers | Insurers | Manufacturers | Body Shops Repair facilities | |
| READ | Manufacturers Dealerships Body Shops DMVs Insurers Salvage vendors Consumers | | Insurers Lienholders Consumers | Insurers Lienholders Consumers | Insurers Consumers | Insurers | Insurers Consumers | Connected cars |
| USE CASE | Title tracking "cradle to grave" | | Claim payment for total loss situation / Auto Refinance | Evidence of insurance | Detecting fraudulent claims | Rating improvements / Improved repair cost estimates | Vehicle history | Claim processing |

USING A DISTRIBUTED LEDGER FOR TRACKING VIN RECORDKEEPING

CROSS REFERENCE TO RELATED APPLICATIONS

This application claims priority to (1) U.S. Provisional Application No. 62/466,917, entitled "Blockchain Vin Registry," filed Mar. 3, 2017; (2) U.S. Provisional Application No. 62/468,092, entitled "Blockchain Vin Registry," filed Mar. 7, 2017; (3) U.S. Provisional Application No. 62/469,070, entitled "Using a Blockchain for Vehicle Lifecycle Processes," filed Mar. 9, 2017; (4) U.S. Provisional Application No. 62/500,977, entitled "Using a Blockchain for Vehicle Lifecycle Processes," filed May 3, 2017; [and] (5) U.S. Provisional Application No. 62/501,621, entitled "Using a Blockchain for Vehicle Lifecycle Processes," filed May 4, 2017; (6) U.S. Provisional Application No. 62/550,131, entitled "Maintaining a Distributed Ledger for VIN Recordkeeping," filed Aug. 25, 2017; (7) U.S. Provisional Application No. 62/550,140, entitled "Using a Distributed Ledger for Total Loss Management," filed Aug. 25, 2017; (8) U.S. Provisional Application No. 62/550,172, entitled "Using a Distributed Ledger for Tracking VIN Recordkeeping," filed Aug. 25, 2017; (9) U.S. Provisional Application No. 62/550,186, entitled "Smart Contracts for Vehicle Events," filed Aug. 25, 2017; (10) U.S. Provisional Application No. 62/550,197, entitled Using a Distributed Ledger for Tracking Vehicle Financial Events," filed Aug. 25, 2017; (11) U.S. Provisional Application No. 62/550,224, entitled "Using a Distributed Ledger for the Auto claims Process," filed Aug. 25, 2017; (12) U.S. Provisional Application No. 62/550,245, entitled "Using a Distributed Ledger to Track a VIN Lifecycle," filed Aug. 25, 2017; (13) U.S. Provisional Application No. 62/550,261, entitled "Using a Distributed Ledger for Proof of Insurance," filed Aug. 25, 2017; (14) U.S. Provisional Application No. 62/557,359, entitled "Systems and Methods for Updating a Loss History Blockchain," filed Sep. 12, 2017; (15) U.S. Provisional Application No. 62/557,393, entitled "Systems and Methods for Analyzing Vehicle Sensor Data Via a Blockchain," filed Sep. 12, 2017; (16) U.S. Provisional Application No. 62/557,403, entitled "Systems and Methods for Utilizing a Blockchain for Maintaining Vehicle Collision Loss History," filed Sep. 12, 2017; (17) U.S. Provisional Application No. 62/557,415, entitled "Systems and Methods for Utilizing a Blockchain for Maintaining Insured Loss History," filed Sep. 12, 2017; (18) U.S. Provisional Application No. 62/557,433, entitled "Systems and Methods for claim Processing Via Blockchain," filed Sep. 12, 2017; and (19) U.S. Provisional Application No. 62/557,446, entitled "Systems and Methods for Updating an Insured Loss History Blockchain," filed Sep. 12, 2017, each of which is hereby incorporated herein by reference in its entirety.

TECHNICAL FIELD

The present disclosure generally relates to the maintenance of a distributed ledger that governs autonomous, smart, or other vehicle transactions or events, and/or related smart contracts, and more particularly, using distributed ledgers for tracking/recordkeeping a Vehicle Identification Number (VIN) for a vehicle.

BACKGROUND

Conventional techniques associated with tracking and maintaining vehicles have limitations associated with tracking each vehicle's current location, current owner, and/or current condition. Conventional techniques may also have other drawbacks.

BRIEF SUMMARY

In one aspect, a computer-implemented method for creating a distributed ledger of transactions pertaining to a particular vehicle may be provided. The method may include: (1) receiving, by one or more processors and/or associated transceivers, vehicle data from one or more computing devices (e.g. user mobile devices, connected vehicles, dealership computers, and/or insurance provider remote servers), such as via wireless communication or data transmission over one or more radio frequency links or digital communication channels; (2) detecting, by the one or more processors, a change in a condition of the vehicle or vehicle-related event (e.g., initial vehicle purchase) from analysis of the vehicle data, the change in the condition of the vehicle being that the vehicle is a new vehicle and the vehicle is being purchased by an initial consumer or individual owner; (3) identifying, by the one or more processors, the VIN of the vehicle or retrieving the VIN from a memory unit or the vehicle when the change in a condition of the vehicle or vehicle-related event is detected; (4) identifying, by the one or more processors, a vehicle build (e.g., list of vehicle features) for the vehicle or retrieving the vehicle build from a memory unit or vehicle when the change in a condition of the vehicle or vehicle-related event is detected; (5) receiving, by the one or more processors and/or associated transceivers, an indication of vehicle lien or loan covering the vehicle and an identification of a bank or lender; (6) receiving, by the one or more processors and/or associated transceivers, an indication of an insurance policy covering the vehicle and an identification of an insurer; (7) receiving, by the one or more processors and/or associated transceivers, vehicle registration information for the vehicle from a department of motor vehicles; (8) creating, by the one or more processors, a distributed ledger for the vehicle that includes: the VIN, a description of the vehicle build; a description or details regarding the vehicle lien or loan; a description or details regarding the insurance policy covering the vehicle (e.g., coverages, limits, deductibles, and conditions), and an identification of the insurer; a name and address of the new owner; a driver's license number of the new owner; and/or an indication that the vehicle is registered; and/or (9) transmitting, from one or more processors and/or associated transceivers to a server, the initial distributed ledger created associated with the vehicle to facilitate creating and/or maintaining a VIN-based distributed ledger for that particular vehicle. The method may include additional, less, or alternate functionality, including that discussed elsewhere herein.

In another aspect, a computer-implemented method for creating a VIN-based distributed ledger of transactions or events pertaining to a particular vehicle may be provided. The method may include (1) receiving, by one or more processors and/or transceivers, vehicle, title, ownership, insurance, registration, maintenance, repair, or financial data from one or more remote computing devices (e.g. user mobile devices, connected vehicles, vehicle sensors, vehicle manufacturer remote servers, bank remote servers, insurance provider remote servers, or repair facility remote servers), such as via wireless communication or data transmission over one or more radio frequency links or digital communication channels; (2) detecting, by the one or more processors, a vehicle-related event for the vehicle from analysis of the vehicle or other data received; (3) identifying, by the one or more processors, the VIN of the vehicle or retrieving the VIN from a memory unit or the vehicle (or the vehicle's processor or memory) when the vehicle-related event is detected; (4) creating, by the one or more processors, a VIN-based distributed ledger for the vehicle when the vehicle-related event is detected; (5) generating, by the one or more processors, a transaction or event (i) including the vehicle's VIN, (ii) describing the vehicle-related event for the vehicle, and/or (iii) detailing a current status, owner, and/or location of the vehicle; and/or (6) adding, by the one or more processors, the transaction or event to the VIN-based distributed ledger for the vehicle to facilitate creating a VIN-based distributed ledger detailing vehicle-related events for the particular vehicle. The method may include additional, less, or alternate functionality, including that discussed elsewhere herein.

In yet another aspect, a computer system configured for creating a distributed ledger of transactions pertaining to a particular vehicle may be provided. The computer system may include one or more processors, sensors, servers, and transceivers configured to: (1) receive vehicle data from one or more computing devices; (2) detect a change in a condition of the vehicle from analysis of the vehicle data, the change in the condition of the vehicle is that the vehicle is a new vehicle and the vehicle is being purchased by an initial consumer; (3) identify the VIN of the vehicle when the change in a condition of the vehicle is detected; (4) identify a vehicle build for the vehicle when the change in a condition of the vehicle is detected; (5) receive an indication of a vehicle lien covering the vehicle and an identification of a lender; (6) receive an indication of an insurance policy covering the vehicle and an identification of an insurer; (7) receive vehicle registration information for the vehicle from a department of motor vehicles; (8) create a distributed ledger for the vehicle that includes: the VIN, a description of the vehicle build; a description or details regarding the vehicle lien or loan; a description or details regarding the insurance policy covering the vehicle, and an identification of the insurer; a name and address of the new owner; and an indication that the vehicle is registered; and/or (9) transmit the initial distributed ledger created associated with vehicle to facilitate maintaining a VIN-based distributed ledger for that particular vehicle. The system may include additional, less, or alternate functionality, including that discussed elsewhere herein.

The method may be implemented via computer systems, and may include additional, less, or alternate actions or functionality. Systems or computer-readable media storing instructions for implementing all or part of the method described above may also be provided in some aspects. Systems for implementing such methods may include one or more of the following: a special-purpose computing device, a personal electronic device, a processing unit of a vehicle, a remote server, one or more sensors, one or more communication modules configured to communicate wirelessly via radio links, radio frequency links, and/or wireless communication channels, and/or one or more program memories coupled to one or more processors of the personal electronic device, processing unit of the vehicle, or remote server. Such program memories may store instructions to cause the one or more processors to implement part or all of the method described above. Additional or alternative features described herein below may be included in some aspects.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIG. 2 depicts an exemplary VIN Chain, which may be associated with compiling transactions into blocks of the distributed ledger or Blockchain VIN Registry, in accordance with some embodiments;

Figure 1A:
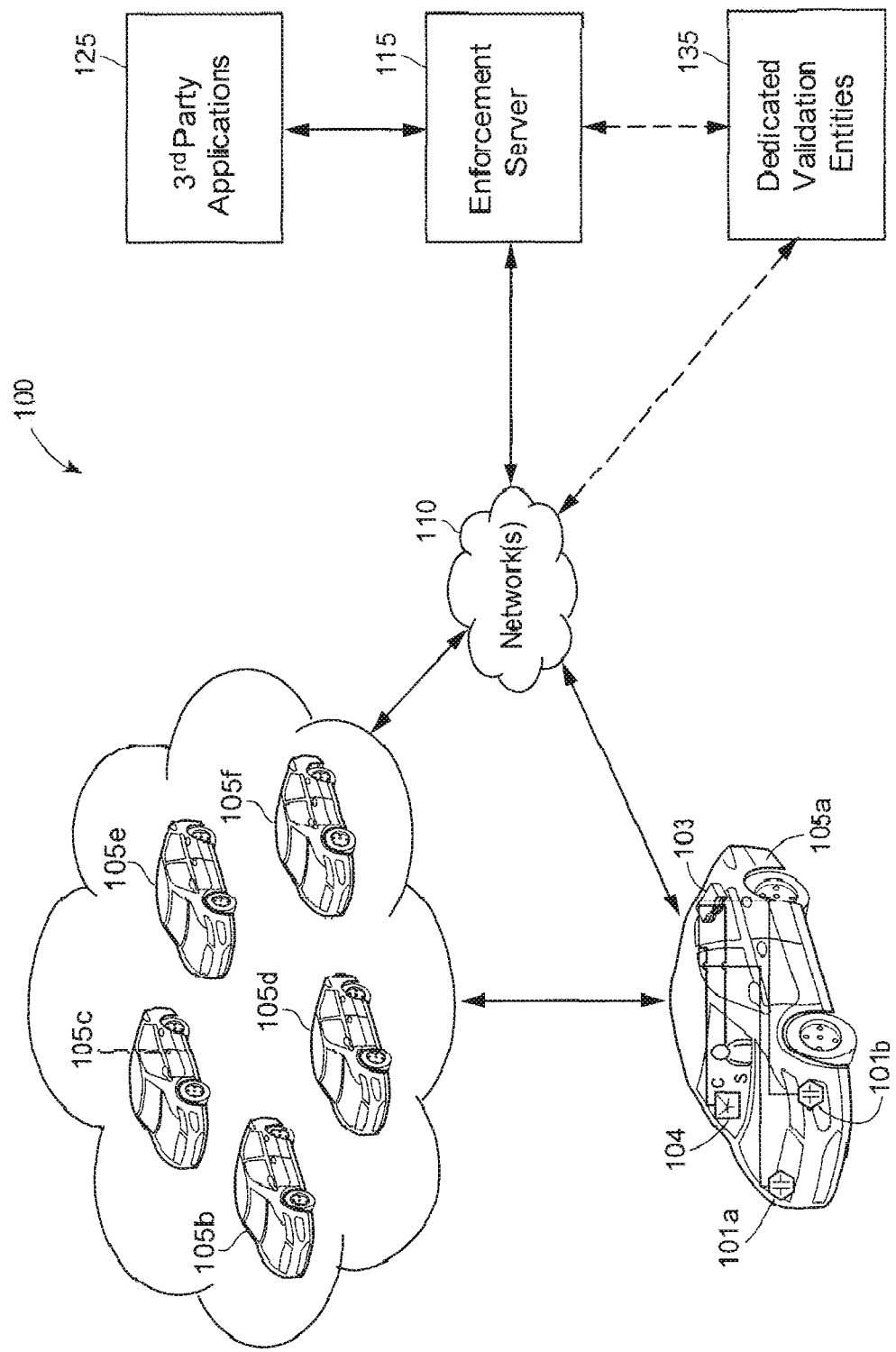
FIG. 1A depicts an exemplary computing environment including components and entities associated with creating, maintaining and utilizing a distributed ledger or Blockchain VIN Registry.

The figures depict aspects of the present embodiments for purposes of illustration only. One skilled in the art will readily recognize from the following discussion that alternate aspects of the structures and methods illustrated herein may be employed without departing from the principles of the invention described herein.

DETAILED DESCRIPTION

The present embodiments may relate to, inter alia, creating and/or maintaining a distributed ledger related to Vehicle Identification Numbers (VINs), i.e., a Blockchain VIN Registry. In some aspects, the Blockchain VIN Registry may be used to maintain vehicle information up-to-date (vehicle location, vehicle owner, vehicle condition, vehicle mileage, vehicle usage, etc.) and/or carry out smart contracts associated with individual vehicles. Each block or update to the Blockchain VIN Registry may include the vehicle's VIN number or use the vehicle's VIN number, or a hash or encrypted version thereof, as a key to access and/or update the Blockchain VIN Registry. Each block or update may also include one or more additional data elements associated with the vehicle or vehicle transactions/events, including those data elements discussed elsewhere herein.

A national or other registry of automobile VIN numbers may be commonly accessed and/or updated by organizations, such as auto manufacturers, insurance carriers, financial institutions, fleet owners, banks, body shops, part suppliers, State Departments of Motor Vehicles (DMVs), and/or salvage vendors. The VIN Registry, utilizing blockchain technology, may be a single, historical, authoritative source for multiple pieces of information about each vehicle that is accessed, tracked, and updated using Vehicle Identification Numbers (VINs).

The Blockchain VIN Registry may have various usages, and may allow for the introduction of new capabilities into current processes. Examples of such usage include: (1) validating proof of insurance on a vehicle (available to law enforcement, lienholders, vehicle owners, etc.); (2) tracking vehicle ownership from "cradle to grave," via seamless title transfers between manufacturers, dealers, consumers, salvage yard, etc.; (3) identifying the current lienholder of a vehicle, and the current lien payoff amount (e.g., for more frictionless processing of payment such as in a total loss situation, or for loan refinancing situations); (4) ensuring lien perfection (e.g., title reflects joint ownership by person and lienholder); (5) reducing fraud by detecting duplicate coverage or duplicate claims for a single vehicle, or detecting buildup or questionable claims; (6) tracking maintenance or repair work that has been, or is to be, performed on a vehicle; (7) when coupled with crash detection, performing first notification of loss to the appropriate insurer; (8) in conjunction with connected car capabilities, limiting the vehicle's capabilities if the vehicle isn't registered properly, lacks insurance coverage, or the owner is behind on loan payments; (9) connected license plates, reflecting the current registration status; (10) facilitating Usage-Based Insurance (UBI) or trip-based insurance; (11) recording all OEM features, part numbers, (autonomous or other vehicle) system or software of versions of the vehicle (beyond what can be derived from the VIN, make, and model information), i.e., the vehicle build; (12) more accurate insurance rating based upon known security or safety features of a vehicle (which may impact either a human driven vehicle, or a semi-autonomous or autonomous vehicle or technology, or both); (13) more accurate repair cost estimations based upon known vehicle features (which may impact human driving, or vehicle self-driving); and/or (14) facilitating recall notifications in a prompt and reliable manner.

Potential blockchain participants may include auto manufacturers, insurance carriers, consumers, individual vehicle owners, fleet owners, salvage vendors, auditors, State DMVs, auto dealerships, banks or credit unions, lienholders, body shops, repair facilities, tow truck operations, part supplies, rental companies, and/or law enforcement.

Potential data elements included in the blockchain and/or each blockchain transaction, block, or update may include vehicle VIN number, and one or more additional data elements associated with that particular vehicle. The additional data elements may include owner information, such as owner type (manufacturer, dealer, consumer, lienholder, etc.); owner ID (EIN, SSN, etc.); owner name; and/or owner contact information (address, phone, email address, etc.). The additional data elements may include insurance carrier information, such as insurer name; insurance policy ID or number; an indication of whether the policy remains in force (Y/N?); effective dates of the policy; expiration date of the insurance coverage; and/or insurance policy coverages, terms, limits, deductibles, conditions, etc.

The additional data elements may include lienholder information, such as lienholder name; lienholder contact information; whether the loan is in good standing (Y/N?); and/or current payoff amount. The additional data elements may include a license plate number; state of issuance; and whether the vehicle registration with the state DMV is up-to-date. The additional data elements may include an indication of any claims made; including date of first notice of loss; insurance carrier that the claim was filed with; claim open date; claim close date; an amount of the claim; and whether or not the claim was resolved. The additional data elements may include information on maintenance or repair events, including event type; event date; event cost; and/or one or more locations associated with the event (e.g., city and state of event location).

The Blockchain VIN Registry may be used in conjunction with smart contracts that govern the vehicles, including autonomous or semi-autonomous vehicles. For instance, the smart contracts may related to maintenance, warranties, vehicle loans, service contracts, UBI, trip-insurance, auto insurance policies, vehicle titles, vehicle salvage, total loss vehicles, etc. When an event or data relevant to a vehicle or a smart contract is generated, a transaction associated with the vehicle's VIN may be generated and compiled into a block of a distributed ledger (or Blockchain VIN Registry). The transaction or update to the distributed ledger or Blockchain VIN Registry may include (i) the vehicle's VIN, and (ii) one or more additional data elements associated with the vehicle, including the additional data elements mentioned elsewhere herein.

Some embodiments may also relate to autonomous vehicle operation monitoring and/or assessment. The operation of the autonomous vehicles may impact the obligations of various parties associated with the autonomous vehicle, for example, an operator of the autonomous vehicle, a manufacturer of the autonomous vehicle, an insurer of the operator, an insurer of the autonomous vehicle, and/or other parties. To this end, the present embodiments may leverage the use of a distributed ledger and/or smart contracts to codify and/or automatically enforce these obligations.

A distributed ledger is a transactional record that is maintained at each node of a peer to peer (P2P) network. Commonly, the distributed ledger is comprised of groupings of transactions bundled together into a "block." When a change to the distributed ledger is made (e.g., when a new transaction and/or block is created), each node must form a consensus as to how the change is integrated into the distributed ledger. Upon consensus, the agreed upon change is pushed out to each node so that each node maintains an identical copy of the updated distributed ledger. Any change that does not achieve a consensus is ignored. Accordingly, unlike a traditional, centralized ledger, a single party cannot unilaterally alter the distributed ledger.

In one application of distributed ledgers, each new block may be cryptographically linked to the previous block in order to form a "blockchain." More particularly, to create a new block, each transaction within a block may be assigned a hash value (i.e., an output of a cryptographic hash function, such as SHA-2 or MD5). These hash values may then be combined together utilizing cryptographic techniques (e.g., a Merkle Tree) to generate a hash value representative of the entire new block. This hash value may then be combined with the hash value of the previous block to form a hash value included in the header of the new block, thereby cryptographically linking the new block to the blockchain. To this end, the precise value utilized in the header of the new block is dependent on the hash value for each transaction in the new block, as well as the hash value for each transaction in every prior block.

According to some aspects, the hash value generated for the new block may be used as an input to a cryptographic puzzle that manipulates a nonce value. When a solution to the cryptographic puzzle is found, the solving node publishes the solution and the other nodes then verify that the solution is the correct solution. Because the solution may also depend on the particular hash values for each transaction within the blockchain, if the solving node attempted to modify any transaction, the solution would not be verified by the other nodes. More particularly, if a single node attempts to modify a prior transaction within the blockchain, a cascade of different hash values are generated for each tier of the cryptographic combination technique. This results in the header for one or more blocks being different than the corresponding header(s) in every other node that did not make the exact same modification. As a result, the solution generated by the modifying node would not solve the cryptographic puzzle presented to any node without the identical modification. Thus, the version of the new block generated by the modifying node is readily recognized as including an improper modification and is rejected by the consensus. This inability to modify past transactions lead to blockchains being generally described as trusted, secure, and/or immutable.

A smart contract is a computer protocol that enables the automatic execution and/or enforcement of an agreement between different parties. In particular, the smart contract may be computer code that is located at a particular address on the blockchain. In some cases the smart contract may run automatically in response to a participant in the blockchain sending funds (e.g., a cryptocurrency such as bitcoin or ether) to the address where the smart contract is stored. Additionally, smart contracts may maintain a balance of the amount of funds that are stored at their address. In some scenarios, when this balance reaches zero, the smart contract may no longer be operational.

The smart contract may include one or more trigger conditions, that, when satisfied, correspond to one or more actions. For some smart contracts, which action(s) from the one or more actions are performed is determined based upon one or more decision conditions. An enforcement entity corresponding to the smart contract may subscribe to one or more data streams including data related to a trigger condition and/or a decision condition. Accordingly, the enforcement entity may route the data streams to the smart contract (such as by using the vehicle's VIN) so that the smart contract may detect that a trigger condition has occurred and/or analyze a decision condition to direct the enforcement entity to perform one or more actions.

As an example, a pay-per-trip insurer may include a maximum distance the autonomous vehicle may traverse in each trip. In this example, a driver and the pay-per-trip insurer may generate a smart contract to insure a particular trip. In response, the enforcement entity may receive an odometer data stream from the covered vehicle as identified by VIN. If the autonomous vehicle incurs liability during the trip (e.g., a trigger event occurred), the smart contract may automatically analyze the odometer data feed, which may include the VIN, to determine whether the autonomous vehicle was operated within the bounds of the maximum distance in the insurance agreement (e.g., a decision condition). Accordingly, the smart contract may direct the performance of an action to automatically assign liability to an operator, autonomous vehicle, or the insurer based upon the odometer data feed. Of course, sensors monitoring an autonomous vehicle may be leveraged to facilitate many other types of transactions associated with a vehicle and/or a smart contract.

Given the relative ease to modify computer files, including a smart contract computer file, and the parties' competing incentives, there needs to be a system that all parties trust to fairly and accurately regulate and enforce the smart contract. For at least the above reasons, a distributed ledger and/or a blockchain system, in this case a Blockchain VIN Registry may be utilized to establish such a trusted system.

To this end, the distributed ledger may be leveraged to record the smart contract and/or the vehicle or other data related to the trigger conditions and/or decision conditions of the smart contract. More particularly, the data, including vehicle sensor data or mobile device sensor data, utilized to determine the presence of a trigger condition and/or to analyze decision conditions to determine an action (such as a VIN-related action or condition) may be recorded within a transaction included in the distributed ledger. By recording this data in the distributed ledger, there is a public and trusted record of the smart contract and the reasoning behind any action performed as directed by the smart contract. As a result, the parties that generated the smart contract may automatically enforce their contracts in a transparent and objective manner. For at least this reason, an entity that regularly generates smart contracts, such as an insurer, may establish a distributed ledger to govern and enforce or maintain a plurality of its smart contracts. According to certain aspects, the distributed ledger may either be a public ledger (each node may readily view the underlying data of each transaction) or a private ledger (the underlying data needs an encryption key to be viewed), or a combination of public and private ledger aspects.

According to certain aspects, an electronic device associated with each vehicle may execute an application to monitor vehicle data that is relevant to the enforcement of a smart contract—such as vehicle operational data, vehicle telematics data, vehicle sensor data, vehicle condition data, mileage data, maintenance data, parts data, system data, system or software version data, mobile device data, GPS data, etc. The application may interpret the vehicle data to generate a "transaction" or a time-stamped record of the relevant vehicle data. In one embodiment, the transaction may include the VIN of an autonomous or other vehicle, a time of the transaction, and an indication of one or more vehicle conditions or events relevant to a smart contract.

In one embodiment, the application may process vehicle data or vehicle operational data to create the indication of the vehicle condition. For example, the application may process an airbag activation event to determine that the autonomous vehicle was involved in a collision. As a result, the application may generate a transaction that indicates a liability-inducing event occurred. The transaction may further include data relating to one or more decision conditions that the smart contract analyzes to determine an action to perform in response to the trigger condition.

Exemplary Environments for Creating & Maintaining Distributed Ledger or Blockchain Vin Registry FIG. 1A depicts an exemplary environment 100 for creating and/or maintaining a distributed ledged or Blockchain VIN Registry. Although FIG. 1 depicts certain entities, components, and devices, it should be appreciated that additional or alternate entities and components are envisioned.

As illustrated in FIG. 1A, the environment 100 may include a plurality of autonomous, smart, or other vehicles 105a-f. As it is generally used herein, the term "autonomous vehicle" refers to any vehicle with autonomous (or even semi-autonomous) capabilities. Thus, "autonomous vehicle" is not limited to fully autonomous vehicles (SAE level 5) and includes even partially automated vehicles (SAE level 2). It should be appreciated that in fully autonomous vehicles, an "operator" may include a person that provides navigational input to the autonomous vehicle and/or a person located within the vehicle at a location wherein the person is capable of engaging manual control should the need and/or desire arise.

As illustrated on the autonomous or smart vehicle 105a, the autonomous or smart vehicle 105a may include one or more sensors 101a-b that monitor the operational status of the autonomous or smart vehicle 105a. The sensors 101 may include, for example, a pressure sensor, a gyroscope, an accelerometer, an odometer, a vibration sensor, a microphone, an image sensor, a temperature sensor, and/or a radar or LIDAR sensor. Some of the sensors 101 may be included in the autonomous or smart vehicle 105a by a manufacturer of the vehicle 105a and others of the sensors 101 may be retrofitted onto the vehicle 105a at some point after manufacture. For example, a fleet manager may retrofit the vehicle 105a with a particular type of sensor that relates to a smart contact frequently generated by the fleet manager.

The autonomous or smart vehicle 105a may further include an electronic device 103 configured to interpret operational or vehicle data generated by the sensors 101. Although FIG. 1A illustrates the electronic device 103 as a processing unit of the vehicle 105a interconnected to the sensors 101 via a communication bus of the vehicle 105a, in other embodiments the electronic device 103 may be a personal electronic device (e.g., a mobile phone, a tablet, a laptop computer, a smart watch, smart glasses, other types of wearable electronics, an on-board diagnostic monitor, and so on) associated with an operator of the vehicle 105a. In these embodiments, the personal electronic device may receive the operational or vehicle data via a wireless interface (e.g., a Bluetooth interface, a Wi-Fi interface, or other known wireless communication interfaces) or a wired interface (e.g., an OBD port, a USB interface, an auxiliary interface, or other known wired communication interfaces). Additional information describing the operation of autonomous vehicles may be found in co-owned U.S. patent application Ser. No. 14/713,249, entitled "AUTONOMOUS VEHICLE OPERATION FEATURE MONITORING AND EVALUATION OF EFFECTIVENESS," the entire disclosure of which is hereby incorporated by reference.

Regardless of the particular type of electronic device, the electronic device 103 may include an application configured to analyze the operational data generated by the sensors 101. More particularly, the application may be configured to analyze the operational or vehicle data to detect a plurality of conditions (e.g., trigger conditions or decision conditions) associated with the vehicle 105a. Periodically and/or in response to a change in condition, the application may generate a transaction that incorporates one or more of the detected conditions, as well as the vehicle VIN.

According to certain aspects, the transaction may include indications of the one or more conditions, a VIN of the vehicle 105a and/or the operator of the vehicle 105a, a timestamp, an indication of a priority, one or more additional data elements as discussed elsewhere (see, e.g., FIG. 2 and discussion thereof), and/or a portion of the operational or vehicle data upon which the one or more detected conditions may be based. The electronic device 103 may transmit generated transactions via an antenna 104. Although FIG. 1 illustrates the antenna 104 as being separate from the electronic device 103, it should be appreciated that for some types of electronic devices, such as a mobile phone, the antenna 104 may be included in the electronic device 103 itself.

The plurality of autonomous, smart, or other vehicles 105a-f may be configured to communicate with an enforcement server 115 via one or more communication networks 110, for example, via wireless communication or data transmission over one or more radio links or digital communication channels. The enforce server 115 may also communicate with $3^{rd}$ party remote servers or $3^{rd}$ party applications 125 via one or more communication networks 110, for example, via wireless communication or data transmission over one or more radio links or digital communication channels. The $3^{rd}$ party remote servers may relate to DMVs, vehicle dealership, insurance provider, financial services providers, part suppliers, vehicle repair facility or body shop, rental company, salvage vendor, and/or other $3^{rd}$ party remote servers or computing devices, including those discussed elsewhere herein.

The networks 110 may facilitate any data communication between the plurality of autonomous vehicles 105a-f and/or $3^{rd}$ party remote servers, and an enforcement server 115 via any standard or technology (e.g., GSM, CDMA, TDMA, WCDMA, LTE, EDGE, OFDM, GPRS, EV-DO, UWB, IEEE 802 including Ethernet, WiMAX, and/or others). According to the present embodiments, the plurality of autonomous, smart, or other vehicles 105a-f and/or $3^{rd}$ party remote servers may transmit generated transactions to the enforcement server 115 via the networks 110. In some embodiments, the networks 110 may include a mesh or ad hoc network wherein a portion of the plurality of vehicles 105a-f or $3^{rd}$ parties function as nodes of the mesh or ad hoc network. Thus, in some embodiments, a transaction generated at the vehicle 105a or $3^{rd}$ party may be routed to, for example, the vehicle 105c and the vehicle 105f or $3^{rd}$ party prior to the enforcement server 115.

It should be appreciated that standard or technology used to communicate between and among the plurality of vehicles 105a-f and $3^{rd}$ parties is not necessarily the same standard or technology utilized to communicate between one of the plurality of vehicles 105a-f or $3^{rd}$ parties, and the enforcement server 115. In addition to the transaction, in some embodiments, one or more of the plurality of vehicles 105 or $3^{rd}$ parties may exchange operational data over the mesh or ad hoc network in response to the one or more of the plurality of vehicles being involved in a collision.

According to certain aspects, the enforcement server 115 may be configured to compile new blocks to add to a blockchain, such as by using the vehicle VIN (e.g., the enforcement server may identify the blockchain to add new blocks to using the VIN, or otherwise use the VIN to access the blockchain or update the blockchain), and to enforce a plurality of smart contracts. The smart contracts may relate to vehicle title, vehicle ownership, vehicle title transfer, vehicle maintenance, vehicle insurance, vehicle repair work or parts, vehicle financing, vehicle build, etc.

Although FIG. 1A illustrates a single enforcement server 115, it should be appreciated that in some embodiments, the enforcement server 115 may be a plurality of interconnected servers, for example, in a cloud computing environment. In one aspect, the enforcement server 115 may periodically compile a plurality of transactions received from the plurality of autonomous vehicles 105 and/or $3^{rd}$ parties. The enforcement server 115 may also periodically compile a plurality of transactions received from the plurality of autonomous, smart, or other vehicles 105 and/or $3^{rd}$ parties in response to receiving an urgent transaction.

After the new block is compiled, the enforcement server 115 may transmit the new block to dedicated validation entities 135 to generate a solution to incorporate the block into blockchain, and/or to form a consensus on the solution. Although FIG. 1 illustrates that the dedicated validation entities as being separate from the enforcement server 115, it should be appreciated that the enforcement server 115 may itself include a module dedicated to generating a solution to the cryptographic puzzle and/or forming a consensus on the solution.

In another aspect, the enforcement server 115 may analyze a smart contract database (not depicted) to determine whether any transactions compiled into the new block are associated with a smart contract, such as by using the vehicle VIN or comparing a block VIN with a smart contract VIN (e.g., each block in the block may use a VIN as an identifier, and each smart contract may also use the VIN as an identifier or as an access key). To this end, the enforcement server 115 may extract from each transaction one or more indications identifying an autonomous, smart, or other vehicle (such as by VIN) and/or an operator of the autonomous vehicle and route the transaction to a respectively corresponding one or more smart contracts that govern the VIN, or the identified vehicle and/or operator. In one scenario, the transaction may include, in addition the VIN, a plurality of vehicle-related, vehicle operational, vehicle or mobile device sensor data; $3^{rd}$ party data or data generated by a $3^{rd}$ party's computing devices or sensors; and/or other data relating to the status of a trigger condition and/or one or more decision conditions.

In response, the particular smart contract may direct the enforcement server 115 to perform an action to enforce the particular smart contract. For example, the action may be to generate and/or file an insurance claim, which may include a vehicle's VIN. Depending on the action, the enforcement server 115 may execute one or more third party applications 125 (or vehicle applications) to carry out the action. In the insurance claim example, a third party insurer may include an application configured to generate and/or process the insurance claim based upon data included in the transaction. As another example, an emergency response entity (e.g., an EMT) may include an application in the third party applications 125 to dispatch a responder to a location of an autonomous vehicle or other vehicle involved in a vehicle collision.

In some scenarios, a decision condition requires the analysis of data not generated at or by an autonomous, smart, or other vehicle. As an example, a decision condition may be related to a weather condition at the time liability occurred (e.g., the presence of rain when the liability was incurred). Accordingly, the smart contract may interact with one or more third party applications 125 to retrieve this additional decision condition data, including information available from third parties or the internet. In this example, one of the third party applications 125 may be a weather service application capable of outputting weather conditions at the location of the vehicle at the time indicated by the timestamp of the transaction. In one aspect, the smart contract may modify the transaction to include the additional condition data (assuming the transaction has not been compiled into a block) and/or generate a new transaction that indicates the additional condition data. The exemplary environment 100 may include additional, fewer, or alternate equipment or components, including those discussed elsewhere herein. Further, in some embodiments, the actions described as being performed by the enforcement server 115 may additionally or alternatively be performed at one or more of the vehicles 105a-f, and/or $3^{rd}$ party servers.

Figure 1B:
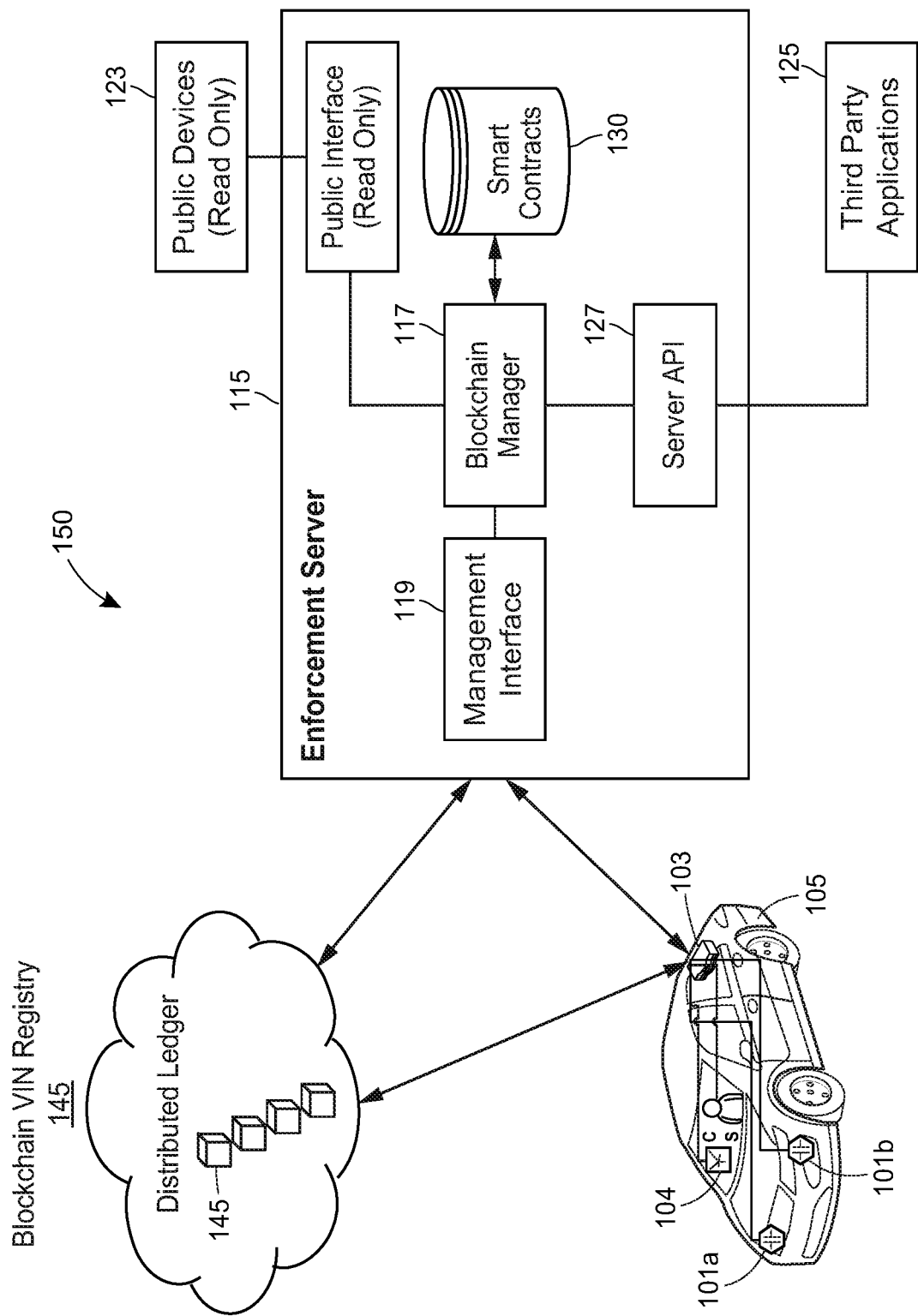
FIG. 1B depicts another exemplary computing environment including components and entities associated with creating, maintaining and utilizing a distributed ledger or Blockchain VIN Registry, in accordance with some embodiments.

Turning now to FIG. 1B, depicted is another exemplary environment 150 for creating and/or maintaining a distributed ledger or Blockchain VIN Registry. Although FIG. 1B depicts certain entities, components, and devices, it should be appreciated that additional or alternate entities and components are envisioned.

As illustrated in FIG. 1B, the environment 150 may include a distributed ledger or Blockchain VIN Registry 145. The distributed ledger or Blockchain VIN Registry 145 may be maintained via a network of nodes, including one or more autonomous, smart, or other vehicles 105, $3^{rd}$ party remote servers or other computing devices, and/or an enforcement server 115. The nodes may have access distributed ledger 145 and/or generate data included in the distributed ledger 145. As described above, the distributed ledger 145 may not be changed without first forming a consensus on the change. Accordingly, as depicted by FIG. 1B, the distributed ledger 145 may be considered separate from any individual node, even though the individual nodes may store local copies of the distributed ledger 145.

According to certain aspects, as described with respect to FIG. 1A, the autonomous or smart vehicle 105 may include a plurality of sensors 101a-b, an electronic device 103, and/or an antenna 104. The autonomous or smart vehicle 105 may communicate with $3^{rd}$ party remote servers, and/or the enforcement server 115 via the electronic device 103 and/or the antenna 104.

As illustrated, the enforcement server 115 may include a blockchain manager 117. The blockchain manager 117 may be a software program, engine, and/or a module that is executed by one or more processors interconnected with the enforcement server 115. In one embodiment, the blockchain manager 117 may compile a plurality of transactions associated with, or identified by, an individual or particular VIN into a block, update the distributed ledger 145 to include a block, route transaction data to one or more smart contracts using the VIN, and/or automatically enforce one or more smart contracts associated with the VIN.

According to certain aspects, an operator of the enforcement server may interact with a management interface 119 to control aspects of the distributed ledger 145 and/or set control parameters associated with the blockchain manager 117. For example, a period for which blocks are generated may be set via the management interface 119. In one aspect, the plurality of smart contracts associated with the distributed ledger 145 and the VIN may be stored in a smart contracts database 130. Although FIG. 1B depicts the smart contract database 130 as a part of the enforcement sever 115, the smart contract database may be maintained within the distributed ledger 145.

According to certain aspects, one or more public devices 123 may access data stored at the enforcement server via a public interface 121, such as by using the vehicle's VIN to access the data. The public interface 121 may be a read only interface that prevents the one or more public devices 123 from writing transactions to the distributed ledger 145. To this end, the one or more public devices 123 may be used, for example, to view data maintained within the distributed ledger 145 associated with a VIN, to view the status of one or more smart contracts associated with the VIN and/or the distributed ledger 145, compile statistics regarding data maintained in the distributed ledger, and so on.

Additionally or alternatively, one or more $3^{rd}$ party applications 125 may interact with the distributed ledger 145 via an API 127 of the enforcement server 115. The $3^{rd}$ party applications 125 may be associated with one or more entities associated with an autonomous vehicle. For example, the $3^{rd}$ party applications 125 may include an application to generate various transactions identified by VIN, such as generate and/or file an insurance claim, send a repair request, send a tow request, contact an emergency service provider, perform maintenance, pay auto claims, update telematics data, update insurance policies, update UBI or trip insurance, update title status, update ownership information, update lien and lienholder information, and so on. It should be appreciated that although FIG. 1B depicts the $3^{rd}$ party applications 125 as separate from the enforcement sever 115, in some embodiments a portion of the $3^{rd}$ party applications 125 may be stored locally at the enforcement server 115.

The exemplary environment 150 may include additional, fewer, or alternate equipment or components, including those discussed elsewhere herein. Further, in some embodiments, the actions described as being performed by the enforcement server 115 may additionally or alternatively be performed at one or more of the autonomous, smart, or other vehicles 105, or mobile devices, or $3^{rd}$ party remote servers or computing devices.

Exemplary VIN Chain or Blockchain VIN Registry

FIG. 2 depicts an exemplary VIN Chain 200. The VIN Chain may be a Blockchain VIN Registry as discussed herein. The VIN for a vehicle may act a key, or other provides access, to the Vin Chain 200, and in some embodiments may be hashed or encrypted.

In some embodiments, each VIN Chain 200 may be a blockchain dedicated to an individual autonomous, smart, or other (conventional) vehicle. The VIN Chain 200 may be required to include the VIN for the vehicle. The VIN may be used to access, identify, or verify the VIN Chain 200 or distributed ledger is associated with the vehicle. The VIN Chain 200 may include one or more additional data elements associated with the vehicle, including those depicted in FIG. 2.

As shown in FIG. 2, the VIN Chain 200 or Blockchain VIN Registry may have a VIN number associated with a particular vehicle that acts as a key to accessing or updating the VIN Chain 200. The VIN Chain 200 may have several data elements, including (1) owner information, (2) title status (clean, salvaged, etc.), (3) lienholder information, (4) lien payoff amount, (5) insurance policy start and stop date, (6) insurance claim open and close date, (7) build data (vehicle features), (8) maintenance and repair dates and types, (9) telematics and odometer data, and/or other data elements, including those discussed elsewhere herein.

For instance, the additional data elements may include telematics data (such as driving, braking, speed, cornering, stop/start, acceleration, etc.) associated with a particular driver or vehicle. The insurance policy information may include UBI or trip-based insurance details, such as location and mileage information. The insurance policy information may also include premiums, discounts, coverages, deductibles, limits, and/or conditions.

As shown in FIG. 2, the owner information and title status blocks in the VIN Chain 200 may be created or updated, and subsequently accessed or read by manufacturers, dealerships, body shops, DMVs, insurers, salvage vendors, individual smart vehicles, vehicle owners, authorized $3^{rd}$ parties, and/or other entities. One use case for this type of information in a blockchain is title tracking from "cradle to grave."

The lienholder and lien amount information blocks in the VIN Chain 200 may by created or updated by lienholders or vehicle owners, and subsequently accessed by insurers, lienholders, and/or consumers. Use cases for this type of information in a blockchain may be the claim payment for a total loss situation, and/or automobile refinancing.

The insurance policy start and end data, and claim open and close date information blocks in the VIN Chain 200 may be created or updated by insurers, smart vehicles, or consumers, and subsequently accessed or read by insurers, lienholders, other vehicles, and consumers. The use cases for this type of information in a blockchain may be providing evidence of insurance, detecting buildup or fraud, and/or alternatively verifying the veracity of insurance claims.

The build data (such as vehicle features or technology) blocks in the VIN claim 200 may be created or updated by manufactures or individual smart vehicles, and subsequently read by other vehicles, insurers, consumers, other manufacturers, repair shops, etc. Use cases for this type of information in a blockchain may include insurance rating (e.g., vehicles having different safety or technological systems that lower or otherwise impact risk may be rated different), and improved repair cost estimates.

The maintenance and repair data blocks in the VIN claim 200 may be created or updated, and subsequently read or accessed by body shops, repair facilities, insurers, individual smart or connected vehicles, etc. A use case for this type of information in a blockchain may include maintaining the vehicle history.

The telematics and/or odometer data blocks in the VIN Chain 200 may be created or updated by individual smart or connected vehicles, and subsequently read by the vehicles, consumers, insurers, or other $3^{rd}$ parties. The telematics and/or odometer data may be used to update smart contracts associated with UBI (Usage-Based Insurance), which may provide insurance for a limited amount of miles or time. Use cases for this type of information in a blockchain may include claim processing, updating insurance discounts, and/or issuing new or additional UBI smart contracts.

Exemplary Vin Based Vehicle Services

Figure 3:
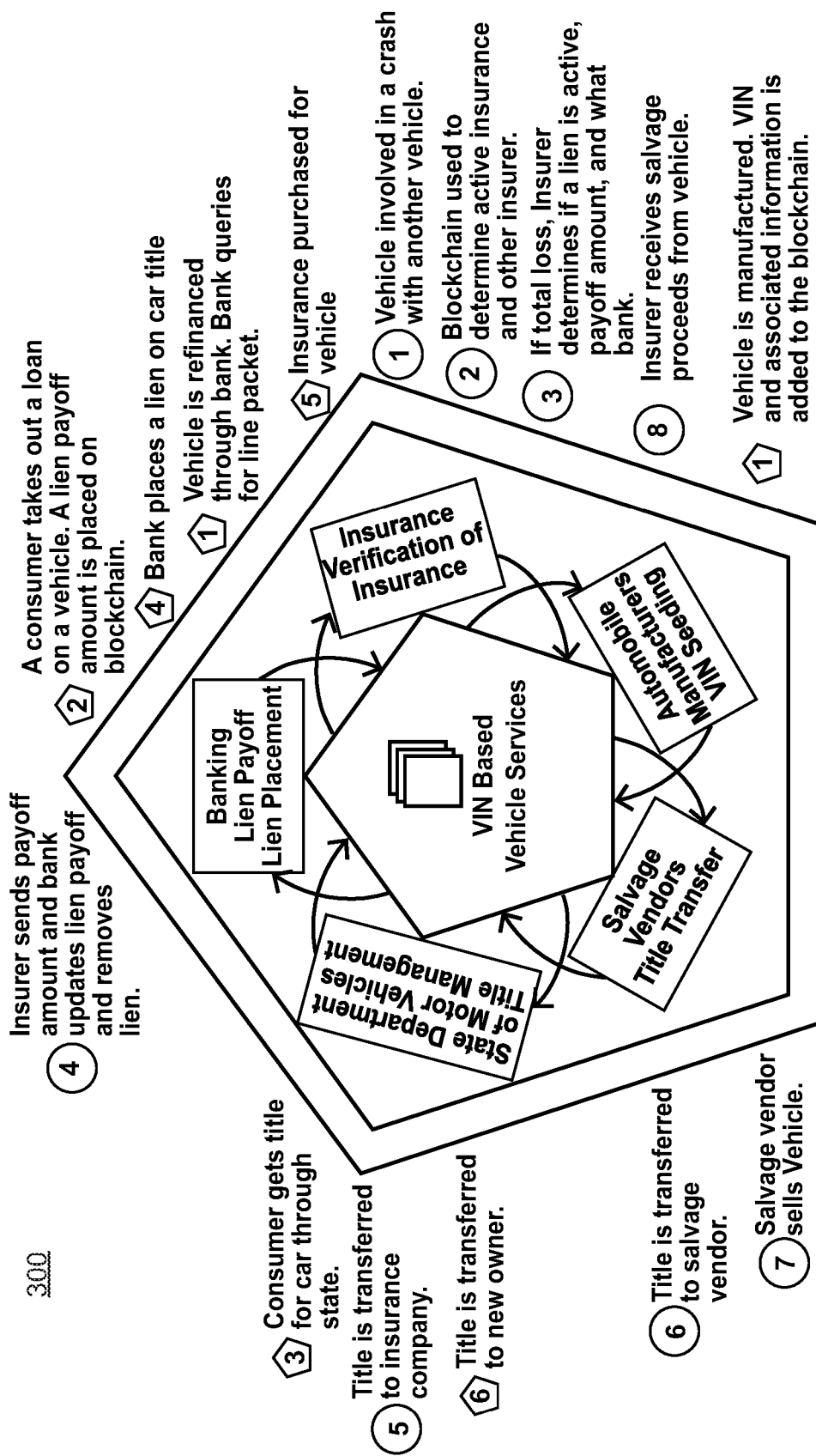
FIG. 3 depicts several exemplary VIN-based vehicle services.

FIG. 3 depicts exemplary VIN based vehicle services that may be facilitated via the Blockchain VIN Registry. The VIN based vehicle services may relate to (1) State Department of Motor Vehicles (e.g., vehicle registration, title management, title transfer, license plates, etc.); (2) Banking (e.g., lien payoff, lien placement or transfer, etc.); (3) Insurance (e.g., verification of insurance, insurance quoting, claim handling, total loss, etc.); (4) Automobile Manufacturers (e.g., VIN seeding, recall notices, technology upgrades, updated software versions, etc.); and/or (5) Salvage Vendors (e.g., title transfer, exchange of monies, sensor or part valuation, vehicle or sensor auction, total loss, etc.).

In one embodiment, transactions associated with a total loss determination may be recorded on the Blockchain VIN Registry. The transactions may include the VIN, and data related to the following events or conditions: (1) a vehicle is involved in a crash with another vehicle; (2) a blockchain may be used to determine active insurance and another insurer; (3) determine if a lien is active, and if so, the present payoff amount, and identify the bank or other lender; (4) the insurer may send the payoff amount and the bank may update the lien payoff and remove the lien on vehicle; (5) title or e-title is transferred to an insurance company; (6) title or e-title is later transferred to a salvage vendor; (7) the salvage vendor may sell the vehicle; and/or (8) after which, title or e-title is subsequently transferred to a new owner, and/or the insurer receives salvage proceeds from vehicle being sold.

In another embodiment, transactions associated with vehicle manufacture and initial vehicle purchase/loan may be recorded on the Blockchain VIN Registry. The transactions may include the VIN, and vehicle or other data related to the following events or conditions: (1) a new vehicle is manufactured, and VIN and associated information is added to the blockchain; (2) a consumer takes out a loan on the new (or another) vehicle, and a lien payoff amount is placed on the blockchain; (3) the consumer receives title or e-title to the vehicle through the State DMV; (4) the bank places a lien on the vehicle title or e-title; and/or (5) auto insurance is purchased for the driver, vehicle, and/or autonomous vehicle.

In another embodiment, transactions associated with vehicle refinancing may be recorded on the Blockchain VIN Registry. The transactions may include the VIN, and vehicle or other data related to the following events or conditions: (1) a vehicle may be refinanced through an original or subsequent bank, (2) the bank may query for a lien packet, (3) loan terms may be determined and updated, (4) payoff amounts may be updated, etc.

Exemplary Virtual Claim Experience Using Blockchain

Figure 4:
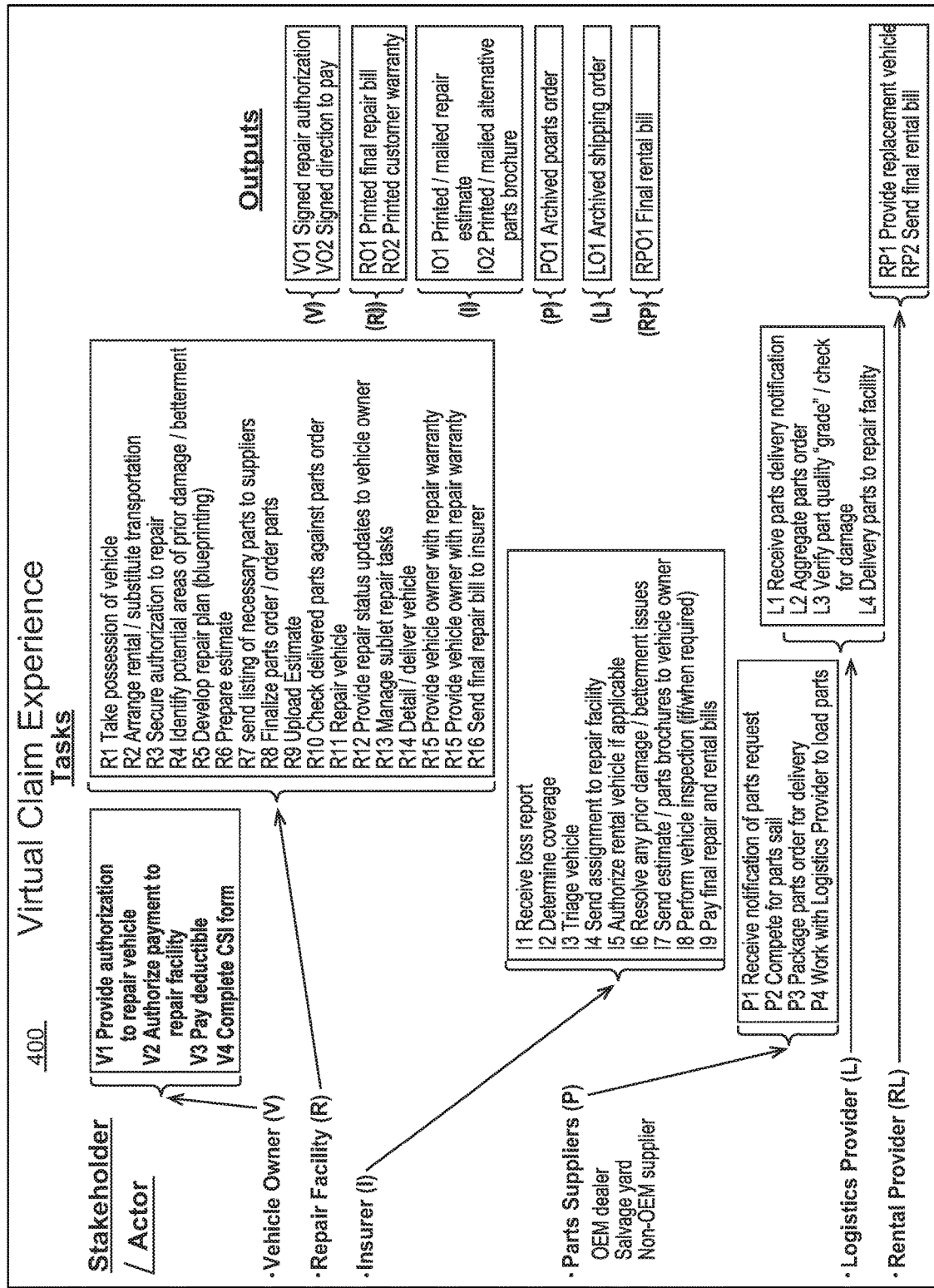
FIG. 4 depicts an exemplary virtual claim experience that includes various tasks and outputs that may be accomplished, at least in part, via the Blockchain VIN Registry.

FIG. 4 depicts exemplary transactions that may be recorded, logged, or updated in each block of a distributed ledger or Blockchain VIN Registry 400. The transactions may each include a VIN for a particular vehicle, and one or more additional data elements. The additional data elements may include (i) identification a stakeholder or actor; (ii) tasks to be performed or that have been completed; (iii) an output; and/or (iv) other data, including that discussed elsewhere herein.

The stakeholder or actor data elements may indicate or identify (1) vehicle owners, (2) repair facilities, (3) insurer, (4) part suppliers, (5) logistics providers, and/or (6) rental providers. Each stakeholder or actor data element may have a corresponding task assigned, or a task be, or has been, completed.

The task data elements for, and/or associated with, vehicle owners may include (1) providing authorization to repair vehicle; (2) authorizing payment to a repair facility; (3) paying a deductible; and/or (4) completing any necessary forms.

The task data elements for, and/or associated with, repair facilities may include (1) taking possession of vehicle; (2) arranging for rental/substitute transportation; (3) securing authorization to repair; (4) identifying potential areas of prior damage/betterment; (5) developing a repair plan; (6) preparing an estimate; (7) sending a listing of necessary parts to suppliers; (8) finalizing parts order and ordering parts; (9) uploading an estimate; (10) checking delivered parts versus parts ordered; (11) repairing the vehicle; (12) providing a repair status updates to the vehicle owner; (13) managing sublet repair tasks; (14) detailing and delivering the vehicle; (15) providing the vehicle owner with a repair warranty; and/or (16) sending a final repair bill to the insurer.

The task data elements for, and/or associated with, insurers may include (1) receiving a loss report; (2) determining coverage and policy conditions; (3) vehicle triage; (4) sending an assignment to the repair facility; (5) authorizing a rental vehicle if applicable; (6) resolving any prior damage/betterment issues; (7) sending an estimate and parts brochures to the vehicle owner; (8) performing a vehicle inspection if and when required; and/or (9) paying the final repair and any rental bills.

The task data elements for, and/or associated with, parts suppliers may include (1) receiving notification of a parts request; (2) competing for a parts sale; (3) packaging parts order for delivery; and/or (4) working with logistics provider to load parts.

The task data elements for, and/or associated with, logistics providers may include (1) receiving parts delivery notification; (2) aggregating a parts order; (3) verifying part quality "grade" and/or checking for part damage; and/or (4) delivering parts to repair facility.

The task data elements for, and/or associated with, rental providers may include (1) providing replacement or rental vehicles; and/or (2) sending a final rental bill.

The output data elements that may be associated with transactions, and identified by VIN, and added to the Blockchain VIN Registry may further include signed repair authorizations and signed directions to pay (associated with the vehicle owner); printed final repair bills and printed customer warranties (associated with the repair facility); printed or mailed repair estimates and printed or mailed alternative parts brochures (associated with the insurer); archived parts orders (associated with the parts supplier); archived shipping orders (associated with the logistics provider); and final rental bills (associated with the rental provider).

Exemplary Method for Using a Distributed Ledger for Tracking Vin Recordkeeping

Figure 5:
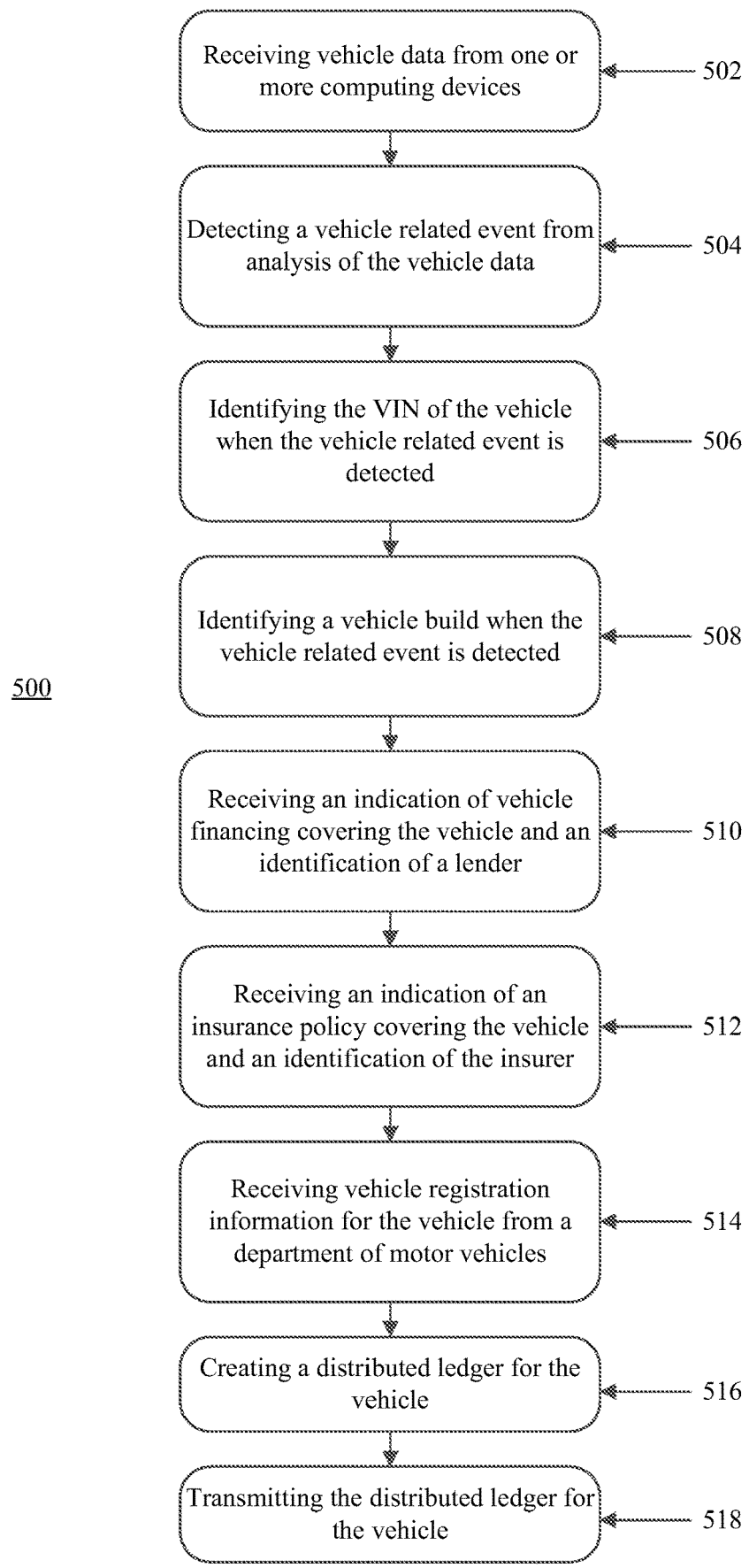
FIG. 5 depicts an exemplary computer-implemented method 500 for creating and/or maintaining a distributed ledger of transactions pertaining to a particular vehicle.

FIG. 5 depicts an exemplary computer-implemented method 500 for creating or interacting with a distributed ledger of transactions or events pertaining to a particular vehicle. The method 500 depicted in FIG. 5 may employ any of the distributed ledger/blockchain techniques, methods, and systems described above with respect to FIGS. 1-4.

When a vehicle is manufactured a Vehicle Identification Number (VIN) is created that identifies the vehicle and its characteristics to anyone that has the number. This VIN is used throughout the life of the vehicle. When a vehicle is sold, when insurance is purchased for the vehicle, when the vehicle is in an accident, are all examples of events that require the use of the vehicle's VIN. These events are not at present reported in a single repository. Instead, the events are often reported and recorded in a wide variety of databases that do not communicate with each other. By using a distributed ledger to track events related to the VIN for a vehicle parties that need to access the vehicle's VIN have a single source of truth to reference. A distributed ledger, or blockchain, allows for more efficient recordkeeping of events related to the VIN.

In one embodiment, a computer-implemented method for creating a distributed ledger of transactions pertaining to a particular vehicle may be provided. The method may include: (1) receiving, by one or more processors and/or associated transceivers, vehicle data from one or more computing devices (e.g. user mobile devices, connected vehicles, dealership computers, and/or insurance provider remote servers), such as via wireless communication or data transmission over one or more radio frequency links or digital communication channels (block 502); (2) detecting, by the one or more processors, a change in a condition of the vehicle or vehicle-related event (e.g., initial vehicle purchase) from analysis of the vehicle data, the change in the condition of the vehicle being that the vehicle is a new vehicle and the vehicle is being purchased by an initial consumer or individual owner (block 504); (3) identifying, by the one or more processors, the VIN of the vehicle or retrieving the VIN from a memory unit or the vehicle when the change in a condition of the vehicle or vehicle-related event is detected (block 506); (4) identifying, by the one or more processors, a vehicle build (e.g., list of vehicle features) for the vehicle or retrieving the vehicle build from a memory unit or vehicle when the change in a condition of the vehicle or vehicle-related event is detected (block 508); (5) receiving, by the one or more processors and/or associated transceivers, an indication of vehicle lien or loan covering the vehicle and an identification of a bank or lender (block 510); (6) receiving, by the one or more processors and/or associated transceivers, an indication of an insurance policy covering the vehicle and an identification of an insurer (block 512); (7) receiving, by the one or more processors and/or associated transceivers, vehicle registration information for the vehicle from a department of motor vehicles (block 514); (8) creating, by the one or more processors, a distributed ledger for the vehicle that includes: the VIN, a description of the vehicle build; a description or details regarding the vehicle lien or loan; a description or details regarding the insurance policy covering the vehicle (e.g., coverages, limits, deductibles, and conditions), and an identification of the insurer; a name and address of the new owner, and/or a driver's license number of the new owner; and an indication that the vehicle is registered (block 516); and/or (9) transmitting, from one or more processors and/or associated transceivers to a server, the initial distributed ledger created associated with the vehicle to facilitate creating and/or maintaining a VIN-based distributed ledger for that particular vehicle (block 518).

Some embodiments of the method include monitoring, by one or more processors and/or transceivers, one or more vehicle conditions and vehicle data (and/or a plurality of sensors associated with a vehicle or mobile device) received via wireless communication or data transmission over one or more radio frequency links or digital communication channels; detecting, by the one or more processors, a change in a condition of the vehicle; identifying, by the one or more processors, the VIN of the vehicle; generating, by the one or more processors, a transaction including (i) the vehicle's VIN, and (ii) describing the detected change in the condition of the vehicle; and/or transmitting, to a server, the transaction to facilitate maintaining VIN-based distributed ledger for the particular vehicle.

In some embodiments of the method, the change in a condition of the vehicle relates to a change in ownership information; title status; lienholder information; lien payoff amount; insurance policy start or end date; insurance claim open or close date; vehicle build data; maintenance and repair data; and/or telematics and/or odometer data, or combinations thereof.

In other embodiments of the method, vehicle data or vehicle condition data is received from a remote server associated with a vehicle manufacturer, repair facility, or bank (such as via wireless communication or data transmission over one or more radio frequency links), and indicates a change in a condition of the vehicle.

In some embodiments, vehicle data, vehicle sensor data, or vehicle condition data is received from a remote computing device associated with a connected vehicle or vehicle owner, such as via wireless communication or data transmission over one or more radio frequency links or digital communication channels. In other embodiments, the change in a condition of the vehicle relates to a total loss, and the transaction describes or details the total loss, and a location thereof. Similarly, in some embodiments the change in a condition of the vehicle relates to a total loss, and the transaction describes or details the total loss, a location thereof, that the vehicle was involved in a vehicle collision with another vehicle, a determination of the insurers of one or more vehicles involved in the vehicle collision, a vehicle loan or lien payoff amount and an identification of the lienholder or bank, an indication of salvage or auction proceeds, an indication of loan payoff and lien removal, an indication of e-title or other title transfer from a lienholder to an insurer, an indication of e-title or other title transfer from an insurer to a salvage vendor, and/or an indication of e-title or title transfer from a salvage vendor to a new vehicle owner.

In other embodiments of the method, the change in a condition of the vehicle relates to a total loss, and the transaction describes or details the total loss, a location thereof, and a vehicle loan or lien payoff amount and an identification of the lienholder or bank.

In some embodiments, the change in a condition of the vehicle relates to a total loss, and one or more transactions are generated and added to the distributed ledger describes or details the transfer of vehicle title from lienholder, to insurer, to salvage vendor, and/or to a new owner. In other embodiments, the change in a condition of the vehicle relates to vehicle financing, and the transaction describes or details terms of a vehicle loan, including interest rate, length of loan, and amount of payoff. Similarly, in other embodiments the change in a condition of the vehicle relates to an indication that the vehicle was involved in a vehicle collision, and the transaction provides an indication of whether or not the vehicle was covered by insurance, and if so, provides an identification and address of the insurer, and terms, conditions, limits, and/or coverages provided by the insurance policy.

In other embodiments, the change in a condition of the vehicle relates to a manufacturer recall that applies to the vehicle, and the transaction provides a current location, current owner, and current owner contact information, and details the parts and/or type of recall.

In some embodiments, the change in a condition of the vehicle relates to a maintenance or repair of the vehicle, and the transaction provides owner authorization to repair the vehicle, owner authorization of payment to the repair facility, payment of a deductible, and/or owner e-signature on required forms. Similarly, the change in a condition of the vehicle may relate to a maintenance or repair of the vehicle, and the transaction provides or details of an estimate provided by a repair facility to repair the vehicle, and/or a list of parts needed to repair the vehicle.

In some embodiments, a computer system configured for creating a distributed ledger of transactions pertaining to a particular vehicle may be provided. The computer system may include one or more processors, sensors, servers, and/or transceivers configured to: (1) receive or collect vehicle data from one or more computing devices (e.g. user mobile devices, connected vehicles, dealership computers, and/or insurance provider remote servers), such as via wireless communication or data transmission over one or more radio frequency links or digital communication channels; (2) detect, a change in a condition (or initial (or other) purchase) of the vehicle from analysis of the vehicle data, the change in the condition of the vehicle is that the vehicle is a new vehicle and the vehicle is being purchased by an initial consumer; (3) identify the VIN of the vehicle or retrieving the VIN from a memory unit when the change in a condition (or initial purchase) of the vehicle is detected; (4) identify a vehicle build (e.g., list of vehicle features) for the vehicle or retrieving the vehicle build from a memory unit when the change in a condition (or initial purchase) of the vehicle is detected; (5) receive, such as via wireless communication or data transmission over one or more radio frequency links, an indication of vehicle lien or loan covering the vehicle and an identification of a bank or lender; (6) receive, such as via wireless communication or data transmission over one or more radio frequency links, an indication of an insurance policy covering the vehicle and an identification of an insurer; (7) receive, such as via wireless communication or data transmission over one or more radio frequency links, vehicle registration information for the vehicle from a department of motor vehicles; (8) create a distributed ledger for the vehicle that includes: the VIN, a description of the vehicle build; a description or details regarding the vehicle lien or loan; a description or details regarding the insurance policy covering the vehicle (e.g., coverages, limits, deductibles, and conditions), and an identification of the insurer; a name and address of the new owner; and an indication that the vehicle is registered; and/or (9) transmit, to a server (such as via wireless communication or data transmission over one or more radio links or digital communication channels), the initial distributed ledger created associated with vehicle to facilitate maintaining a VIN-based distributed ledger for that particular vehicle.

In an alternative embodiment, a computer-implemented method for creating a VIN-based distributed ledger of transactions or events pertaining to a particular vehicle may be provided. The method may include (1) receiving, by one or more processors and/or transceivers, vehicle, title, ownership, insurance, registration, maintenance, repair, or financial data from one or more remote computing devices (e.g. user mobile devices, connected vehicles, vehicle sensors, vehicle manufacturer remote servers, bank remote servers, insurance provider remote servers, or repair facility remote servers), such as via wireless communication or data transmission over one or more radio frequency links or digital communication channels; (2) detecting, by the one or more processors, a vehicle-related event for the vehicle from analysis of the vehicle or other data received; (3) identifying, by the one or more processors, the VIN of the vehicle or retrieving the VIN from a memory unit or the vehicle (or the vehicle's processor or memory) when the vehicle-related event is detected; (4) creating, by the one or more processors, a VIN-based distributed ledger for the vehicle when the vehicle-related event is detected; (5) generating, by the one or more processors, a transaction or event (i) including the vehicle's VIN, (ii) describing the vehicle-related event for the vehicle, and/or (iii) detailing a current status, owner, and/or location of the vehicle; and/or (6) adding, by the one or more processors, the transaction or event to the VIN-based distributed ledger for the vehicle to facilitate creating a VIN-based distributed ledger detailing vehicle-related events for the particular vehicle.

In some embodiments, the method may include transmitting, from one or more processors and/or transceivers to a server (such as via wireless communication or data transmission over one or more radio frequency links), the transaction and/or VIN-based distributed ledger to nodes in a communication via a network to facilitate creating and/or maintaining a VIN-based distributed ledger detailing vehicle-related events for the particular vehicle.

In some embodiments, the vehicle-related event is vehicle financing or re-financing. Similarly, the vehicle-related event may be a purchase of a new or used vehicle. In other embodiments, the vehicle-related event may be insuring a new or used vehicle under a new or different insurance policy or insurer. In other embodiments, the vehicle-related event may be that the vehicle has been classified a total loss, or that the vehicle has been involved in a vehicle collision.

In some embodiments of the method, the vehicle-related event is that coverages, limits, deductibles, conditions, premiums, or discounts associated with an insurance policy covering the vehicle have changed. Similarly, the vehicle-related event is that an insurance claim associated with the vehicle has been submitted to an insurer.

In other embodiments, the vehicle-related event is that the vehicle has been registered with a DMV, or that the vehicle has been sold, or that title for the vehicle has been transferred to another party or entity, or more generally, that ownership of the vehicle has changed.

In another embodiment, a computer system configured for creating a VIN-based distributed ledger of transactions or events pertaining to a particular vehicle may be provided. The computer system comprising one or more processors, sensors, transceivers, and/or servers configured to: (1) receive vehicle, title, ownership, insurance, registration, maintenance, repair, or financial data from one or more remote computing devices (e.g. user mobile devices, connected vehicles, vehicle sensors, vehicle manufacturer remote servers, bank remote servers, insurance provider remote servers, or repair facility remote servers), such as via wireless communication or data transmission over one or more radio frequency links or digital communication channels; (2) detect a vehicle-related event for the vehicle from analysis of the vehicle or other data received; (3) identify the VIN of the vehicle or retrieving the VIN from a memory unit or the vehicle (or the vehicle's processor or memory) when the vehicle-related event is detected; (4) create a VIN-based distributed ledger for the vehicle when the vehicle-related event is detected; (5) generate a transaction or event (i) including the vehicle's VIN, (ii) describing the vehicle-related event for the vehicle, and/or (iii) detailing a current status, owner, and/or location of the vehicle; and/or (6) add the transaction or event to the VIN-based distributed ledger for the vehicle to facilitate creating a VIN-based distributed ledger detailing vehicle-related events for the particular vehicle.

ADDITIONAL CONSIDERATIONS

An authoritative, trusted, immutable, distributed, shareable, secure system may be needed to record if a human driver is controlling a vehicle, and/or if the vehicle is acting autonomously. The record may include crash sensor data to record crash information correlating to driver control information.

Blockchain technology may be used to store the transactions of control instances (from autonomous to human control to autonomous, for example). These control instances may be stored as they occur into blocks. Accordingly, this data may be included into the distributed ledger environment of the blockchain. In this environment, a consensus system may fix the events/blocks immutably and securely.

In some scenarios, the blockchain may have public interfaces that allow visibility into the data. In one embodiment, a private blockchain interface may also be used by auto manufacturers, law enforcement, insurers, and regulatory agencies.

As noted herein, after collection of the information regarding the vehicle by one or more nodes within a communication network, a transaction (and/or new block) including the vehicle information collected may be broadcast to the blockchain, and/or a new block verified and then added to the blockchain to reflect an updated state of the vehicle. For each of the computer-implemented methods discussed herein, in one embodiment, a transaction and/or new block may be generated and then broadcast to the blockchain network for verification once vehicle data, and/ or new sensor or other data, have been generated and/or collected by one or more nodes within the communication network. As such, tracking the status of a vehicle may be more reliable and/or fraud-resistant as each node may include a proof-of-identity in its transaction modifying the state of the vehicle and/or vehicle-related blocks or blockchain.

Further, with the computer-implemented methods discussed herein, network participants may function as full nodes that validate and/or generate new blocks and transactions, and/or compile transactions into blocks that are then added to the network. However, not all participants need be nodes that compile transactions into blocks, and/or validate transactions and blocks received from other network participants—as some network participants may wish to rely on other network nodes to provide computer processing and/or storage services that enable usage of the system or blockchain.

An element of smart contracts may also be enabled in the system. Depending on the sequence of events in the blockchain, terms of the smart contract may be executed immediately, such as sending a tow truck to the geolocation if tow assistance is a part of the policy, filing a legal action by a subrogation team of an insurer is brought against an auto manufacturer (for example, if an accident occurs when the autonomous vehicle was in autonomous control), conducting a policy review, filing a police report request with the jurisdiction of the roadway, processing claims awards made (for example, a partial payment if deductible is met, to handle car rental or minor medical expense), sending a renewal notice for the policy, and so on.

In some aspects, customers may opt-in to a rewards, loyalty, or other program. The customer may allow a remote server, such as an enforcement server, to collect sensor, telematics, smart or autonomous vehicle, mobile device, and other types of data discussed herein. With customer permission or affirmative consent, the data collected may be analyzed to provide certain benefits to customers. For instance, insurance cost savings may be provided to lower risk or risk averse customers. Discounts, including cryptocurrency, may be awarded to accounts associated with the customer. The other functionality discussed herein may also be provided to customers in return for them allowing collection and analysis of the types of data discussed herein, as well as participating in the validation of the data discussed herein.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for creating a distributed ledger of transactions pertaining to a vehicle, the method comprising:
   receiving, by one or more processors, vehicle data from one or more computing devices;
   detecting, by the one or more processors, a vehicle-related event from analysis of the vehicle data, the vehicle-related event being that the vehicle is a new vehicle and the vehicle is being purchased;
   identifying, by the one or more processors, a Vehicle Identification Number (VIN) of the vehicle when the vehicle-related event is detected;
   identifying, by the one or more processors, a vehicle build when the vehicle-related event is detected;
   receiving, by the one or more processors, an indication of vehicle financing covering the vehicle and an identification of a lender;
   receiving, by the one or more processors, an indication of an insurance policy covering the vehicle and an identification of an insurer;
   receiving, by the one or more processors, vehicle registration information for the vehicle from a department of motor vehicles;
   creating, by the one or more processors, an initial distributed ledger for the vehicle that includes:
   the VIN,
   a description of the vehicle build;
   a description regarding a vehicle lien or loan;

a description regarding the insurance policy covering the vehicle, and an identification of the insurer;
a name and address of a new owner; and
an indication that the vehicle is registered; and
transmitting, from one or more processors to a server, the initial distributed ledger created associated with the vehicle to facilitate maintaining a VIN-based distributed ledger for the vehicle.

2. The computer-implemented method of claim 1, the method further comprising:
monitoring, by one or more processors, one or more vehicle conditions;
detecting, by the one or more processors, a change in a condition of the vehicle;
identifying, by the one or more processors, the VIN of the vehicle;
generating, by the one or more processors, a transaction including (i) the vehicle's VIN, and (ii) describing the detected change in the condition of the vehicle; and
transmitting, to a server, the transaction to facilitate maintaining VIN-based distributed ledger for the vehicle.

3. The method of claim 2, wherein the change in a condition of the vehicle relates to a change in ownership information, title status, lienholder information, lien payoff amount, insurance policy date, insurance claim date, vehicle build data, maintenance data, telematics data, odometer data, or combinations thereof.

4. The method of claim 2, wherein vehicle data is received from a remote server associated with a vehicle manufacturer, repair facility, or bank, and indicates a change in a condition of the vehicle.

5. The method of claim 2, wherein vehicle data, vehicle sensor data, or vehicle condition data is received from a remote computing device associated with a vehicle.

6. The method of claim 2, wherein the change in a condition of the vehicle relates to a total loss, and the transaction describes the total loss, and a location thereof.

7. The method of claim 2, wherein the change in a condition of the vehicle relates to a total loss, and the transaction describes the total loss, a location thereof, that the vehicle was involved in a vehicle collision with another vehicle, a determination of insurers of one or more vehicles involved in the vehicle collision, a vehicle loan payoff amount and an identification of a lienholder, an indication of salvage or auction proceeds, an indication of loan payoff, an indication of title transfer from a lienholder to an insurer, an indication of title transfer from an insurer to a salvage vendor, an indication of title transfer from a salvage vendor to a new vehicle owner, or combinations thereof.

8. The method of claim 2, wherein the change in a condition of the vehicle relates to a total loss, and the transaction describes the total loss, a location thereof, a vehicle loan payoff amount, and an identification of a lienholder.

9. The method of claim 2, wherein the change in a condition of the vehicle relates to a total loss, and one or more transactions are generated and added to the distributed ledger describing the transfer of vehicle title from lienholder, to insurer, to salvage vendor, to a new owner, or to combinations thereof.

10. The method of claim 2, wherein the change in a condition of the vehicle relates to vehicle financing, and the transaction describes terms of a vehicle loan, including interest rate, length of loan, and amount of payoff.

11. The method of claim 2, wherein the change in a condition of the vehicle relates to an indication that the vehicle was involved in a vehicle collision, and the transaction provides an indication of whether the vehicle was covered by insurance, and if so, provides an identification and address of the insurer, and terms, conditions, limits, and coverages provided by the insurance policy.

12. A computer system configured for creating a distributed ledger of transactions pertaining to a vehicle, the computer system comprising one or more processors, sensors, servers, and transceivers configured to:
receive vehicle data from one or more computing devices;
detect a change in a condition of the vehicle from analysis of the vehicle data, the change in the condition of the vehicle being that the vehicle is a new vehicle and the vehicle is being purchased by an initial consumer;
identify a Vehicle Identification Number (VIN) of the vehicle when the change in a condition of the vehicle is detected;
identify a vehicle build for the vehicle when the change in a condition of the vehicle is detected;
receive an indication of a vehicle lien covering the vehicle and an identification of a lender;
receive an indication of an insurance policy covering the vehicle and an identification of an insurer;
receive vehicle registration information for the vehicle from a department of motor vehicles;
create an initial distributed ledger for the vehicle that includes:
the VIN,
a description of the vehicle build;
a description or details regarding the vehicle lien or loan;
a description or details regarding the insurance policy covering the vehicle, and an identification of the insurer;
a name and address of a new owner; and
an indication that the vehicle is registered; and
transmit the initial distributed ledger created associated with vehicle to facilitate maintaining a VIN-based distributed ledger for the vehicle.

13. The computer system of claim 12, the computer system further configured to:
monitor one or more vehicle conditions and vehicle data;
detect a change in a condition of the vehicle;
identify the VIN of the vehicle;
generate a transaction including (i) the vehicle's VIN, and (ii) describing the detected change in the condition of the vehicle; and
transmit, to a server, the transaction to facilitate creating and/or maintaining VIN-based distributed ledger for the vehicle.

14. The method of claim 13, wherein the change in a condition of the vehicle relates to a change in ownership information, title status, lienholder information, lien payoff amount, insurance policy date, insurance claim date, vehicle build data, maintenance data, telematics data, odometer data, or combinations thereof.

15. The system of claim 13, wherein vehicle data is received from a remote server associated with a vehicle manufacturer, repair facility, or bank, and indicates a change in a condition of the vehicle.

16. The system of claim 13, wherein vehicle data, vehicle sensor data, or vehicle condition data is received from a remote computing device associated with a vehicle.

* * * * *